(No Model.)

A. STAMM.
SHEET METAL BOX.

No. 405,443. Patented June 18, 1889.

WITNESSES:

INVENTOR
August Stamm
BY
Goepel & Raegener
ATTORNEYS.

UNITED STATES PATENT OFFICE.

AUGUST STAMM, OF NEW YORK, N. Y.

SHEET-METAL BOX.

SPECIFICATION forming part of Letters Patent No. 405,443, dated June 18, 1889.

Application filed November 3, 1888. Serial No. 289,866. (No model.)

*To all whom it may concern:*

Be it known that I, AUGUST STAMM, of the city, county, and State of New York, have invented certain new and useful Improvements in Sheet-Metal Boxes, of which the following is a specification.

This invention relates to an improved sheet-metal box which is intended to be used as a receptacle for chewing-tobacco, pills, salves, shoe-blacking, and other substances, the box having the advantage of being readily opened or closed without requiring hinges for connecting the lid to the body of the box; and the invention consists of a sheet-metal box the body of which is provided along one-half of its edge with a flanged rim, and of a laterally-swinging cover or lid that is pivoted at one side to the body and provided at one end with a box-shaped portion which, in connection with the rim of the body, retains the lid firmly in closed position.

Figure 1:
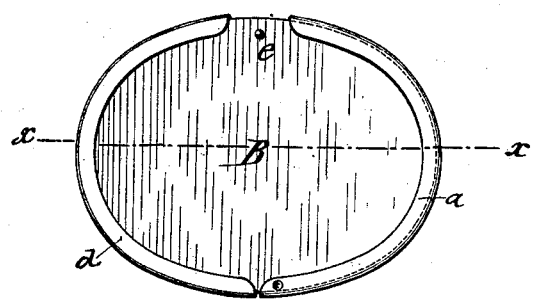
Figure 2:
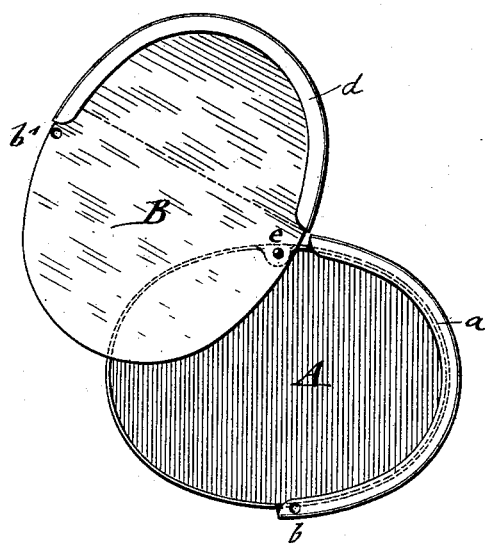
Figure 3:
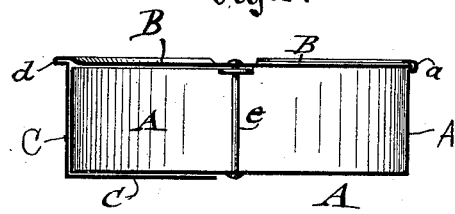

In the accompanying drawings, Figure 1 represents a top view of my improved sheet-metal box, shown in closed position; Fig. 2, a top view of the same showing it in open position; and Fig. 3 is a vertical longitudinal section of the same on line $x\ x$, Fig. 1.

Similar letters of reference indicate corresponding parts.

In the drawings, A represents the body of my improved sheet-metal box, which body is made of round or oval shape and provided along one-half of its upper edge with an inwardly-flanged rim $a$.

The lid B is made of sheet metal like the body A, and is applied by a pivot $e$ to one side of the body A, said pivot passing through the lid and bottom of the box and being provided with enlarged ends, so as to connect the lid and body.

The lid B is provided at a portion of its circumference with a box-shaped portion C, that fits over one end of the body A and serves to retain the lid rigidly in closed position on the same. The lid B engages the flanged rim $a$, and a depression $b$ of said rim engages a corresponding depression $b'$ on the lid, as shown clearly in Figs. 1 and 3.

The lid B is provided with a folded rim $d$ at one-half of its circumference, said rim $d$ being symmetrical to, or nearly so, with the rim $a$. The lid swings into open or closed position while in the plane of the box, and forms always a part of the box, without getting detached therefrom and getting lost or mislaid.

Having thus described my invention, I claim as new and desire to secure by Letters Patent—

1. A sheet-metal box composed of a body having a flanged rim and a lid pivoted at the side of the body and adapted to swing in the plane of the box, said lid being engaged by said rim, substantially as set forth.

2. A sheet-metal box composed of a body having a flanged rim and a lid pivoted at the side of the body and engaged by said rim, said lid being provided with a box-shaped portion that fits over one end of the body, so as to retain the lid on the box in connection with the flanged rim, substantially as set forth.

In testimony that I claim the foregoing as my invention I have signed my name in presence of two subscribing witnesses.

AUGUST STAMM.

Witnesses:
PAUL GOEPEL,
CARL KARP.